US008757133B2

(12) United States Patent  
Czapka et al.

(10) Patent No.: US 8,757,133 B2  
(45) Date of Patent: Jun. 24, 2014

(54) GASEOUS FUEL AND INTAKE AIR MIXER FOR INTERNAL COMBUSTION ENGINE

(75) Inventors: Jason Czapka, Lansing, IL (US); Edward J. Lyford-Pike, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 71 days.

(21) Appl. No.: 13/595,961

(22) Filed: Aug. 27, 2012

(65) Prior Publication Data

US 2014/0053816 A1 Feb. 27, 2014

(51) Int. Cl.
*F02B 43/00* (2006.01)
*F02M 29/00* (2006.01)
*F02M 61/14* (2006.01)

(52) U.S. Cl.
USPC ....... 123/527; 123/528; 123/529; 123/27 GE; 123/525; 123/590; 123/470; 261/16; 261/62

(58) Field of Classification Search
CPC .... F02B 43/00; F02M 25/0722; F02M 61/14; F02M 29/00
USPC ............. 123/527, 528, 529, 27 GE, 525, 590; 261/16, 62
See application file for complete search history.

(56) References Cited

U.S. PATENT DOCUMENTS

| | | | |
|---|---|---|---|
| 3,664,315 A * | 5/1972 | Kramer | 123/445 |
| 3,913,617 A | 10/1975 | van Laar et al. | |
| 4,476,827 A * | 10/1984 | Basaglia et al. | 123/276 |
| 4,494,515 A * | 1/1985 | Brown | 123/527 |
| 4,520,766 A * | 6/1985 | Akeroyd | 123/27 GE |
| 4,699,630 A | 10/1987 | Lee et al. | |
| 4,872,440 A * | 10/1989 | Green | 123/590 |
| 5,408,978 A * | 4/1995 | Davis | 123/527 |
| 5,551,407 A * | 9/1996 | Greenway | 123/527 |
| 5,611,203 A | 3/1997 | Henderson et al. | |
| 5,913,239 A | 6/1999 | Morris, Jr. et al. | |
| 5,992,388 A * | 11/1999 | Seger | 123/470 |
| 6,131,552 A | 10/2000 | Paielli et al. | |
| 6,250,261 B1 * | 6/2001 | Santarossa | 123/27 GE |
| 6,419,210 B1 * | 7/2002 | Low | 261/62 |
| 6,425,382 B1 | 7/2002 | Marthaler et al. | |
| 6,619,343 B2 * | 9/2003 | Stoddart et al. | 141/286 |
| 7,090,203 B2 * | 8/2006 | Goto | 261/22 |
| 7,100,459 B2 | 9/2006 | Gehner et al. | |

(Continued)

FOREIGN PATENT DOCUMENTS

DE 102007035556 A1 * 1/2009 ............ F02M 25/07
EP 1 051 524 B1 10/2001

*Primary Examiner* — Lindsay Low
*Assistant Examiner* — Tea Holbrook
(74) *Attorney, Agent, or Firm* — Faegre Baker Daniels LLP

(57) ABSTRACT

A gaseous fuel mixer for an internal combustion engine includes a mixer body and a mixer element supported in a mixer passage formed in the mixer body. The gaseous fuel mixer attaches to an intake manifold at a first end and receives intake air at a second end. A distal end of the mixer element accepts gaseous fuel from a manifold passage extending from a port positioned in the intake manifold. The gaseous fuel flows through the mixer element and then through a plurality of openings formed in an exposed proximate end of the mixer element. The gaseous fuel mixes with the intake air, and the mixture of intake air and gaseous fuel flows from the second end of the mixer body to the first end of the mixer body and then to the intake manifold.

20 Claims, 2 Drawing Sheets

(56) References Cited

U.S. PATENT DOCUMENTS

| | | | |
|---|---|---|---|
| 7,389,770 B2* | 6/2008 | Bertilsson et al. | 123/568.17 |
| 7,743,756 B2* | 6/2010 | Styles et al. | 123/568.17 |
| 7,841,322 B2* | 11/2010 | Bach | 123/543 |
| 8,267,068 B1* | 9/2012 | Low | 123/468 |
| 2002/0148451 A1* | 10/2002 | Yamamoto et al. | 123/527 |
| 2005/0161028 A1* | 7/2005 | Wolters | 123/527 |
| 2005/0172460 A1* | 8/2005 | Geppert et al. | 24/279 |
| 2006/0092758 A1* | 5/2006 | Ellmers | 366/163.2 |
| 2010/0282238 A1 | 11/2010 | He | |
| 2010/0300407 A1* | 12/2010 | Ravenhill et al. | 123/468 |
| 2011/0146635 A1* | 6/2011 | Zeitoun | 123/568.11 |
| 2011/0265482 A1* | 11/2011 | Parsania et al. | 60/740 |

* cited by examiner

GASEOUS FUEL AND INTAKE AIR MIXER FOR INTERNAL COMBUSTION ENGINE

TECHNICAL FIELD

This disclosure relates to a gaseous fuel and intake air mixer for an internal combustion engine, particularly for a dual fuel, e.g., diesel and natural gas, engine.

BACKGROUND

Internal combustion engines have been adapted to use alternative fuels, such as a gaseous fuel, which includes natural gas, propane, landfill gas, biogas, waste water gas, etc. However, some engines require significant modifications to be able to use gaseous fuel. Some engine designs may be unable to accept gaseous fuel. It may also be desirable to use more than one fuel in an engine to take advantage of the most available or lowest cost fuel. Such engines may be called dual fuel or flexible fuel engines. Thus, configuring an engine to accept a gaseous fuel or to use more than one type of fuel is beneficial.

SUMMARY

This disclosure provides an internal combustion engine, comprising an intake manifold, a gaseous fuel system, and a gaseous fuel mixer. The gaseous fuel mixer is attached to the intake manifold at a first end and is adapted to receive intake air at a second end. The gaseous fuel mixer includes a mixer body and a mixer element. The mixer body forms a mixer passage positioned to direct intake air along an intake air flow path in a first direction. The mixer element is positioned in the mixer passage. The mixer element includes a flow passage positioned to receive gaseous fuel from the gaseous fuel system and to direct the gaseous fuel along a gas flow path in a second direction that is opposite the first direction. The mixer element further includes a plurality of openings extending through the mixer element transverse to the gas flow path to direct gaseous fuel from the gas flow path into the intake air flow path.

This disclosure also provides a gaseous fuel mixer for an internal combustion engine comprising a mixer body and a mixer element. The mixer body includes a mixer passage, a proximate end, and a distal end. The mixer body is adapted to receive intake air at the proximate end and adapted to attach to an intake manifold at the distal end. The mixer element is supported in the mixer body. The mixer element is adapted to receive a supply of gaseous fuel at the mixer body distal end, to transport the gaseous fuel to the mixer body proximate end, and to permit the gaseous fuel to flow transversely from the mixer element.

This disclosure also provides a method of providing a mixture of gaseous fuel intake air to an internal combustion engine. The method comprises providing a supply of gaseous fuel to a port, extending a manifold passage from the port to a distal end of a mixer element positioned in a mixer passage formed in a gas mixer, and connecting a supply of intake air to the gas mixer at a proximate end of the gas mixer. Gaseous fuel flows through the mixer element from a distal end of the gas mixer to the proximate end of the gas mixer, and a mixture of gaseous fuel and intake air flows from the proximate end of the gas mixer through the mixer passage to the distal end of the gas mixer.

This disclosure also provides an internal combustion engine comprising an intake manifold, a gaseous fuel system, and a gaseous fuel mixer. The intake manifold includes a primary flow passage, a port, and a manifold passage extending from the port. The gaseous fuel system is connected to the port. The gaseous fuel mixer is positioned upstream of the primary flow passage and is adapted to receive intake air at a first end. The gaseous fuel mixer includes a mixer body forming a mixer passage and a mixer element positioned in the mixer passage. The mixer element includes a gas flow passage positioned to receive gaseous fuel from the manifold passage and to direct the gaseous fuel through the mixer body from a second end of the gaseous fuel mixer to the first end. The mixer element also includes at least one opening to permit the gaseous fuel to flow from the mixer element and to mix with the intake air at the first end of the gaseous fuel mixer. The mixer passage is positioned to direct the intake air and gaseous fuel downstream through the mixer body toward the primary flow passage.

Advantages and features of the embodiments of this disclosure will become more apparent from the following detailed description of exemplary embodiments when viewed in conjunction with the accompanying drawings.

DETAILED DESCRIPTION

Figure 1:
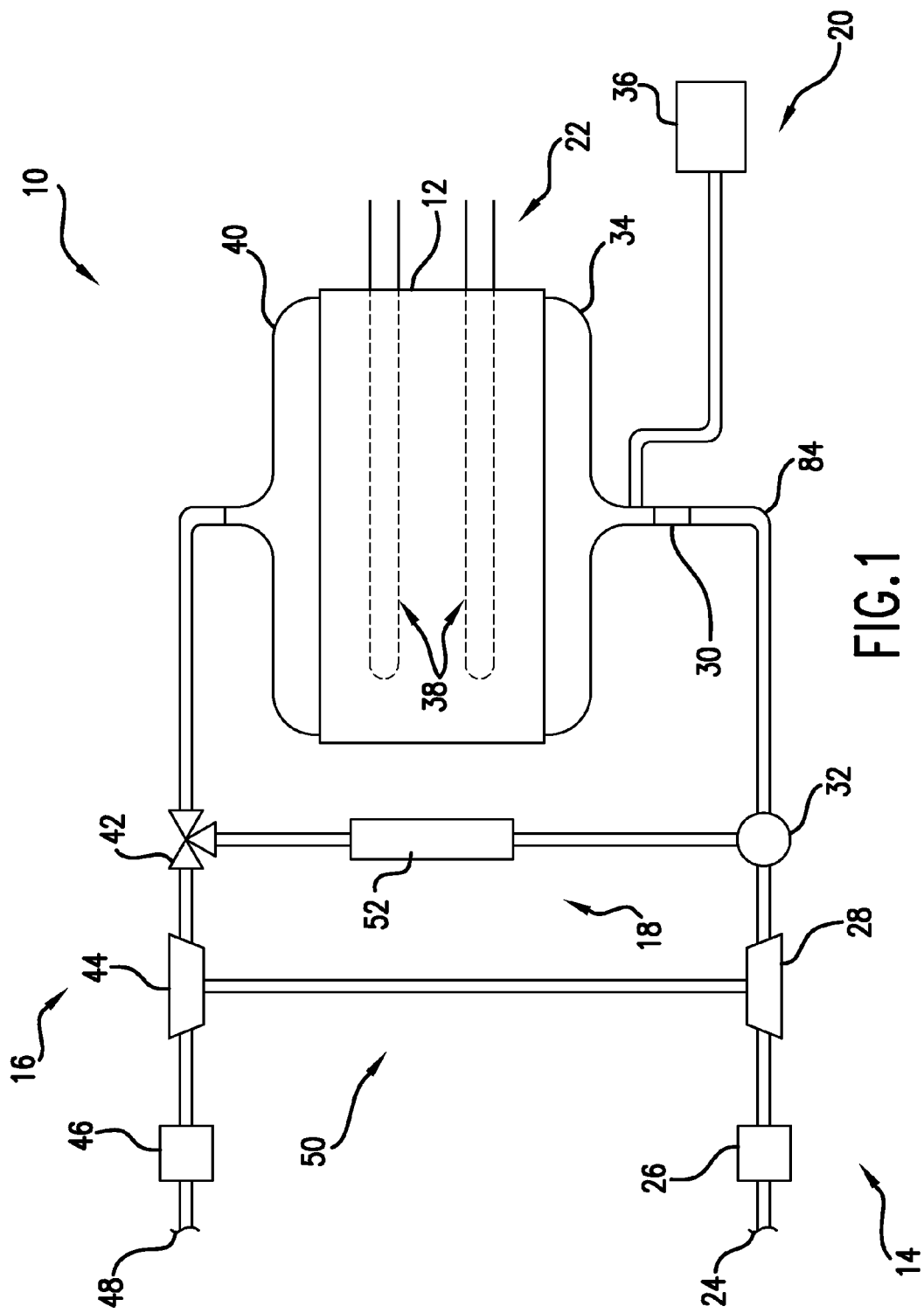
FIG. 1 is an internal combustion engine including an exemplary embodiment of the present disclosure.

Referring to FIG. 1, a portion of a conventional internal combustion engine is shown as a simplified schematic and generally indicated at 10. Engine 10 includes an engine body 12, an intake circuit 14, an exhaust circuit 16, an optional exhaust gas recirculation (EGR) system 18, and a gaseous fuel system 20. Engine 10 may also include a fuel system 22 if engine 10 is configured in a dual fuel configuration.

Intake circuit 14 connects to engine body 12 and includes an inlet portion 24, a filtration portion 26, a compressor 28, a gaseous fuel mixer 30, and an intake manifold 34. Inlet portion 24 permits external air to enter intake circuit 14, thus becoming intake air. Compressor 28 is positioned along intake circuit 14 downstream from inlet portion 24 and functions to pressurize the intake air for delivery to intake manifold 34. Filtration portion 26 is positioned along intake circuit 14 between inlet portion 24 and compressor 28, upstream from compressor 28. Gaseous fuel mixer 30 is positioned along intake circuit 14 downstream from compressor 28. Gaseous fuel mixer 30 provides a mixture of gaseous fuel and intake air to intake manifold 34. Because the intake air received by gaseous fuel mixer 30 is pressurized, gaseous fuel mixer 30 may also be called a gaseous fuel and boost air mixer. An EGR mixer 32 may be positioned along intake circuit 14 between compressor 28 and gaseous fuel mixer 30, and functions to provide a mixture of EGR gas and intake air to gaseous fuel mixer 30.

Gaseous fuel system 20 provides a source of gaseous fuel, which may include natural gas or propane, for engine 10 and includes a gaseous fuel storage system 36. Gaseous fuel system 20 may include other elements, such as pressure regulators and valves (not shown), to regulate the flow of gaseous fuel to gaseous fuel mixer 30.

Figure 2:
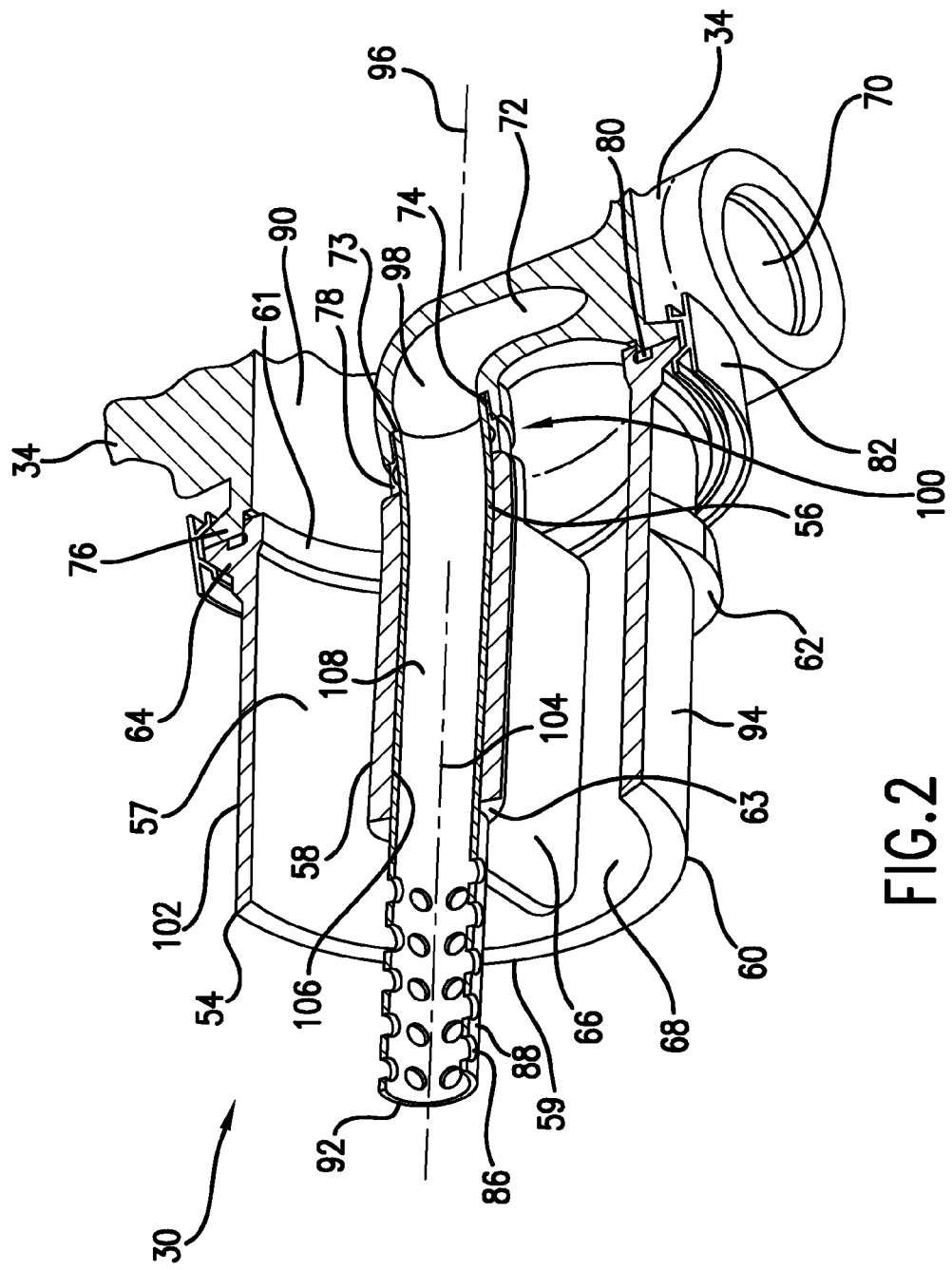
FIG. 2 is a gaseous fuel and intake air mixer of the internal combustion engine of FIG. 1 in accordance with an exemplary embodiment of the present disclosure.

Intake manifold 34 is connected to engine body 12. If engine 10 is a dual fuel engine, internal to engine body 12 may be a common rail fuel system 38 that is part of fuel system 22. Common rail fuel system 38 delivers a primary fuel, e.g., diesel, to fuel injectors positioned adjacent to combustion chambers of cylinders (not shown) positioned in engine body 12. As best seen in FIG. 2, intake manifold 34 includes a primary flow passage 90 having a flow axis 96 extending in the direction of flow downstream and a manifold interface 76, which may be a half Marmon flange, positioned at an upstream side of intake manifold 34. A gas inlet port 70 is also positioned in intake manifold 34 to receive gaseous fuel from natural gas system 20. An enclosed manifold passage 72, formed within intake manifold 34, extends from port 70 inwardly into primary flow passage 90, transverse to flow axis 96, and in the exemplary embodiment, perpendicular to flow axis 96. Manifold passage 72 includes a bend portion 98, which turns into a direction that is into or against the flow of intake air, and a connection portion 100 forming a connection interface for connecting to gas mixer 30. In the exemplary embodiment, bend portion 98 is a 90-degree bend or turn and connection portion 100 is positioned in a common plane extending through manifold interface 76. A counter bore 74 may be formed in intake manifold 34 that opens into manifold passage 72 to receive gas mixer 30.

Exhaust circuit 16 connects to engine body 12 and includes an exhaust manifold 40, a turbine 44, an aftertreatment system 46, and an atmospheric vent 48. Exhaust manifold 40 connects to engine body 12. Turbine 44 is positioned along exhaust circuit 16 downstream from exhaust manifold 40. Aftertreatment system 46 is positioned along exhaust circuit 16 between turbine 44 and atmospheric vent 48, downstream from turbine 44 and upstream from vent 48.

High-pressure exhaust gas from the combustion chambers (not shown) is guided into exhaust circuit 16. The high-pressure exhaust gas drives turbine 44 of a turbocharger 50, which further drives compressor 28. The exhaust gas flows downstream from turbine 44 to aftertreatment system 46, which may include one or more filters, one or more catalysts, and/or one or more selective catalytic reduction devices. The aftertreatment system operates to remove particulates and certain emissions from the exhaust gas, e.g., NOx.

EGR system 18 may extend from exhaust circuit 16 to intake circuit 14. An EGR valve 42 is positioned along exhaust circuit 16 downstream from exhaust manifold 40. EGR valve 42 is operable to permit exhaust gas to flow into EGR system 18. An EGR cooler 52 is positioned along EGR system 18 downstream from EGR valve 42 and is operable to remove heat from the EGR exhaust gas before the EGR exhaust gas enters EGR mixer 32.

Referring now to FIG. 2, exemplary embodiment gaseous fuel and intake air mixer 30 of the present disclosure is shown. Gaseous fuel mixer 30 includes a body 54 and a mixer element 56 positioned within body 54. Body 54 includes an outer portion 102 forming a mixer passage 57. In the exemplary embodiment, mixer 30 also includes a support portion 66 that supports and positions mixer element 56 in mixer passage 57. Support portion 66 may extend around mixer element 56 either partially or completely. If support portion 66 extends around mixer element 56 completely, then support portion 66 may include an inner boss 58.

In the exemplary embodiment, inner boss 58 supports and directly contacts mixer element 56 by having mixer element 56 insert cast, cast in place insert, or molded within inner boss 58. In another embodiment, mixer element 56 may contain features that permit mixer element 56 to support itself. In yet another embodiment, mixer element 56 may be press fit into inner boss 58 or secured by other means. In another configuration, support portion 66 and/or inner boss 58 may be integral with mixer element 56. Mixer element 56 may also be supported by and extend from intake manifold 34 and may be attached to intake manifold 34 by welding, threads, or other techniques. Support portion 66 may also be integral with outer portion 102.

The various elements of the exemplary embodiment are described as being separate elements. Separate elements have the advantage of allowing the addition of the gaseous fuel mixer to an existing engine. In an alternative embodiment, the mixer body may be formed integrally with the intake manifold and the mixer element may be an extension of the portion of the intake manifold that forms the manifold passage. Such a configuration may be created by, as an example, a sand casting technique.

Outer portion 102 may be generally elongated and cylindrically shaped, having a central axis 104. Central axis 104 may be coaxial with flow axis 96. Mixer passage 57 extends from a second or proximate end 59 of mixer 30 to a first or distal end 62 of mixer 30. As will be seen, mixer passage 57 directs a mixture of intake air and gaseous fuel along a flow path through mixer 30 to intake manifold 34. In the exemplary embodiment, mixer body 54 also includes a hose bead or lip 60, a stop 62, and a mixer interface 64, which may be a half Marmon flange. As described hereinabove, mixer 30 also includes support portion 66 that connects mixer element 56 to an interior wall 68 of mixer body 54. Support portion 66 is connected to or may be formed integrally with, and extends transversely between, outer portion 102 and mixer element 56. Support portion 66 has an annular extent that engages mixer element 56 and is sufficient to support mixer element 56 rigidly within passage 57 under all operating and assembly conditions. As noted hereinabove, the annular extent may be in the form of inner boss portion 58. Inner boss portion 58 of support portion 66 may have an elongated cylindrical shape to form an inner cavity 106 for receiving and securing mixer element 56. Boss 58, and therefore mixer element 56, may be located centrally within passage 57 and may be coaxial with passage 57. While not shown, additional support portions similar to support portion 66 may be positioned about mixer element 56. For example, an additional support portion may be positioned between mixer element 56 and interior wall 68 opposite support portion 66 shown in FIG. 2. Where each inner support portion 66 contacts mixer element 56, each support portion 66 may extend annularly about mixer element 56. The annular extent of each support portion 66 may connect with adjacent annular extents to form inner boss 58.

First end 61 of gaseous fuel mixer 30 connects to intake manifold 34 at mixer interface 64, which mates with manifold interface 76, and connection portion 100. In the exemplary embodiment, connection portion 100 includes counter bore 74 sized and positioned to receive an exposed first or distal end 73 of mixer element 56. Mixer element 56 includes a central bore or flow passage 108 aligned with passage 72 for receiving gaseous fuel. A first fluid seal 78, which in an exemplary embodiment may be a rectangular seal, is positioned along mixer element 56 in contact with intake manifold 34 and central boss 58 to prevent gaseous fuel from flowing into mixer passage 57 or primary flow passage 90 in an undesirable location. In an alternative embodiment, a first end of a mixer element may extend to a location proximate intake manifold 34 and may include a face seal between the mixer element and intake manifold 34. In other embodiments, a floating seal or other seal configurations may be used to prevent leakage of gaseous fuel as it flows from manifold passage 72 into central bore 108. A second fluid seal 80, which may be an o-ring seal, gasket, form-in-place material or other suitable configuration, is positioned between mixer interface 64 and manifold interface 76. Second fluid seal 80 prevents undesirable leakage of gases from mixer passage 57 and intake manifold 34 outside of intake circuit 14 and into the atmosphere. A clamp 82, which in the exemplary embodiment is a Marmon type clamp, holds mixer 30 to intake manifold 34 along mixer interface 64 and manifold interface 76. In another embodiment, mixer 30 may be attached to intake manifold 34 by fasteners or via other techniques.

An exposed second or proximate end 92 of mixer element 56 extends a distance longitudinally or axially away from a proximate end 63 of inner boss 58 in a direction that is generally opposite first or distal end 73. A plurality of transversely opening holes or openings 86 are arrayed or positioned angularly about an exposed periphery 88 of mixer element 56. In the exemplary embodiment, openings 86 are round. In other embodiments, openings 86 may be elongated or other shapes, as long as openings 86 provide sufficient flow of gaseous fuel through periphery 88 and prevent excessive backpressure into gaseous fuel system 20. Second or proximate end 92 of mixer element 56 may be closed or may be open to permit flow of gaseous fuel to mix with the intake air flowing into mixer 30, depending on the volume of gaseous fuel necessary for optimal combustion in engine body 12. In an alternative embodiment where the gaseous fuel mixer is placed further upstream from intake manifold 34, permitting an extended distance for gaseous fuel and intake air to mix prior to entering intake manifold 34, openings 86 may be eliminated and all gas flow is through proximate end 92.

Mixer element 56 may be a tube, a pipe, or a similar device. The use of a tube or a pipe may be convenient for ease of manufacture and assembly, especially with respect to transverse openings 86. However, mixer element may be a cast component or other device that is configured to perform the functions described herein.

Gaseous fuel system 20 connects to intake manifold 34 at port 70. A tube, hose or other component 84 connects the upstream portion of intake circuit 14 to mixer 30. In the exemplary embodiment, component 84 slides over second or proximate end 59 of mixer 30, which may include hose bead 60, engaging an external surface 94 of mixer body 54. Component 84 may engage stop 62. A clamp (not shown) may secure component 84 to mixer 30. Alternatively, component 84 may be secured to mixer body 54 by other means, such as welding, depending on the material of component 84.

Internal combustion engine 10 functions as follows. External air enters intake circuit by way of inlet portion 24. The air is treated in filtration portion 26 before flowing downstream to compressor 28, where the intake air is pressurized. The intake air may mix with EGR exhaust gas in EGR mixer 32 before flowing downstream through component 84 before reaching mixer 30.

Gaseous fuel system 20 provides gaseous fuel to intake circuit 14 by way of port 70. Port 70 may be a port normally used for intake air provided to an air compressor, functioning as an outlet for pressurized intake air. Thus, mixer 30 may be part of a retrofit to an existing engine, permitting the addition of mixer 30 to an existing manifold interface 76 and introduction of gaseous fuel into port 70. One advantage to the installation of gaseous fuel mixer 30 as described is that it requires little or no change to an existing engine, which helps maintain emissions and performance of the engine while operating with the primary, i.e., diesel, system.

The gaseous fuel flows from port 70 into manifold passage 72, transversely to axis 96, through bend portion 98, across connection portion 100, and then into the first or distal end 73 of mixer element 56. The gaseous fuel then follows a flow path downstream through central bore 108 of mixer element 56, in a direction that is away from intake manifold 34, toward second or proximate end 92 of mixer element 56, which is shaped and positioned in mixer passage 57 to direct the gaseous fuel in a direction that is against the flow of intake air, or upstream with respect to the direction of flow of intake air. In the exemplary embodiment, the flow of gaseous fuel is opposite the direction of intake airflow. The gaseous fuel then flows from central bore 108 transversely through openings 86. The configuration of openings 86 on peripheral surface 88 of mixer element 56 provides uniform introduction of gaseous fuel into the intake air flowing into mixer passage 57 and may provide additional gaseous fuel through second or proximate end 92 of mixer element 56. The mixture of intake air and gaseous fuel then flows through mixer passage 57 into intake manifold 34, in a direction that is reversed from the direction in which the gaseous fuel was transported through mixer element 56. In the exemplary embodiment, the downstream flow of gaseous fuel and intake air through mixer passage 57 toward intake manifold 34 is opposite the direction of gaseous fuel flow through mixer element 56.

While a mixture of gaseous fuel and intake or boost air may flow into mixer 30, if engine 10 is a dual fuel engine, a control system (not shown) may shut off the flow of gaseous fuel from gaseous fuel system 20 in favor of a fuel from fuel system 22. The fuel from fuel system 22 may be diesel in an exemplary embodiment.

High-pressure exhaust gas flows into exhaust manifold 40 of exhaust circuit 16. The exhaust gas flows downstream to turbine 44 of turbocharger 50, rotating turbine 44, which caused rotation of compressor 28. The exhaust gas loses pressure as it flows through turbine 44 and then passes into an aftertreatment system 46. Aftertreatment system 46 treats certain emissions in the exhaust gas, for example, aftertreatment system 46 may remove particulates, reduce NOx, and reduce carbon monoxide. The exhaust gas then flows downstream to atmospheric vent 48, which may be an exhaust pipe or stack. Engine 10 may include an EGR system 18. If this system exists, EGR valve 42 may direct a portion of the exhaust gas flow into EGR system 18. Because EGR gas is hot, EGR cooler 52 may reduce the temperature of the EGR gas prior to introduction of the EGR gas into EGR mixer 32.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
an intake manifold;
a gaseous fuel system; and
a gaseous fuel mixer attached to the intake manifold at a first end and adapted to receive intake air at a second end, the gaseous fuel mixer including a mixer body forming a mixer passage positioned to direct intake air along an intake air flow path in a first direction, and a mixer element positioned in the mixer passage, the mixer element including a flow passage positioned to receive gaseous fuel from the gaseous fuel system and to direct the gaseous fuel along a gas flow path in a second direction opposite the first direction and a plurality of openings extending through the mixer element transverse to the gas flow path to direct gaseous fuel from the gas flow path into the intake air flow path.

2. The internal combustion engine of claim 1, wherein the gaseous fuel system is connected to a port formed in the intake manifold.

3. The internal combustion engine of claim 2, wherein the intake manifold includes a manifold passage extending from the port to a location proximate a first end of the mixer element.

4. The internal combustion engine of claim 3, wherein the manifold passage includes a counter bore for receiving the first end of the mixer element.

5. The internal combustion engine of claim 3, wherein a seal is positioned along the mixer element and is in contact with the intake manifold.

6. The internal combustion engine of claim 1, wherein the engine is a dual fuel engine and a second fuel is diesel.

7. The internal combustion engine of claim 1, the mixer body further including a hose bead on a proximate end of the mixer body and a hose stop on a peripheral surface of the mixer body.

8. The internal combustion engine of claim 1, wherein an inner boss supports the mixer element and a support portion extends from the inner boss to an interior wall of the mixer body.

9. A gaseous fuel mixer for an internal combustion engine, comprising:
a mixer body including a mixer passage, a proximate end, and a distal end, the mixer body receives intake air at the mixer body proximate end and attaches to an intake manifold at the mixer body distal end; and
a mixer element supported in the mixer body, the mixer element receives a supply of gaseous fuel at a mixer element distal end, transports the gaseous fuel through the mixer body to a mixer element proximate end, and permits the gaseous fuel to flow transversely from the mixer element.

10. The gaseous fuel mixer of claim 9, wherein the mixer body includes a half Marmon flange.

11. The gaseous fuel mixer of claim 9, the mixer body further including a hose bead on the proximate end of the mixer body and a hose stop on a peripheral surface of the mixer body.

12. The gaseous fuel mixer of claim 9, wherein a support portion positions the mixer element in the mixer passage.

13. The gaseous fuel mixer of claim 9, wherein an inner boss supports the mixer element and a support portion extends from the inner boss to an interior wall of the mixer body.

14. A method of providing a mixture of gaseous fuel and intake air to an internal combustion engine, the method comprising:
providing a supply of gaseous fuel to a port;
extending a manifold passage from the port to a distal end of a mixer element positioned in a mixer passage formed in a gas mixer; and
connecting a supply of intake air to the gas mixer at a proximate end of the gas mixer such that gaseous fuel flows through the mixer element from a distal end of the gas mixer to the proximate end of the gas mixer, and a mixture of gaseous fuel and intake air flows from the proximate end of the gas mixer through the mixer passage to the distal end of the gas mixer.

15. The method of claim 14, wherein the manifold passage connects to the mixer element at a connection portion.

16. The method of claim 15, wherein the connection portion includes a counter bore for receiving the distal end of the mixer element.

17. The method of claim 14, wherein the engine is a dual fuel engine and a second fuel is diesel.

18. The method of claim 14, the mixer body further including a hose bead on a proximate end of the mixer body and a hose stop on a peripheral surface of the mixer body.

19. An internal combustion engine, comprising:
an intake manifold including a primary flow passage, a port, and a manifold passage extending from the port;
a gaseous fuel system connected to the port; and
a gaseous fuel mixer positioned upstream of the primary flow passage and adapted to receive intake air at a first end, the gaseous fuel mixer including a mixer body forming a mixer passage and a mixer element positioned in the mixer passage, the mixer element including a gas flow passage positioned to receive gaseous fuel from the manifold second end of the gaseous fuel mixer to the first end, and at least one opening to permit the gaseous fuel to flow from the mixer element and to mix with the intake air at the first end of the gaseous fuel mixer, the mixer passage positioned to direct the intake air and gaseous fuel downstream through the mixer body toward the primary flow passage.

20. The internal combustion engine of claim 19, wherein the at least one opening includes a plurality of transverse openings formed on a periphery of the mixer element.

* * * * *